United States Patent
Zhang et al.

(10) Patent No.: US 12,543,209 B2
(45) Date of Patent: Feb. 3, 2026

(54) TECHNIQUES FOR MITIGATING INTER-USER EQUIPMENT (UE) INTERFERENCE IN WIRELESS COMMUNICATIONS

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 742 days.

(21) Appl. No.: 17/887,170

(22) Filed: Aug. 12, 2022

(65) Prior Publication Data
US 2024/0057143 A1     Feb. 15, 2024

(51) Int. Cl.
  *H04W 4/00*   (2018.01)
  *H04B 17/345*   (2015.01)
  *H04W 24/10*   (2009.01)
  *H04W 52/02*   (2009.01)
  *H04W 72/23*   (2023.01)
  *H04W 72/541*   (2023.01)

(52) U.S. Cl.
  CPC ........ *H04W 72/541* (2023.01); *H04B 17/345* (2015.01); *H04W 24/10* (2013.01); *H04W 52/0212* (2013.01); *H04W 72/23* (2023.01)

(58) Field of Classification Search
  CPC ............................. H04W 24/10; H04B 17/345
  See application file for complete search history.

(56) References Cited

U.S. PATENT DOCUMENTS

| | | | |
|---|---|---|---|
| 2007/0156016 A1* | 7/2007 | Betesh | A61B 1/00055 600/102 |
| 2012/0015659 A1* | 1/2012 | Kalyani | H04W 72/541 455/450 |
| 2013/0044621 A1* | 2/2013 | Jung | H04J 11/005 370/336 |
| 2014/0301217 A1* | 10/2014 | Choi | H04L 5/14 370/278 |
| 2015/0078215 A1* | 3/2015 | Zhou | H04L 5/003 370/277 |
| 2015/0189666 A1* | 7/2015 | Wang | H04W 72/54 370/329 |
| 2020/0112420 A1* | 4/2020 | Xu | H04L 5/0073 |

(Continued)

*Primary Examiner* — Elisabeth Benoit Magloire
(74) *Attorney, Agent, or Firm* — ArentFox Schiff, LLP

(57) ABSTRACT

Aspects described herein relate to mitigating interference between user equipment (UE) based on sensing signals from serving network nodes. In some aspects, a signal metric of a downlink transmission from a victim serving network node that serves a victim UE can be measured, and an uplink transmission can be transmitted or refrained from transmitting to a serving network node that serves the aggressor UE based on comparing the signal metric to a threshold related to inter-UE cross link interference. In other aspects, a signal metric of a downlink control information (DCI) from an aggressor network node that schedules uplink transmission for an aggressor UE can be measured and a downlink transmission can be received or refrained from receiving from a serving network node that serves the victim UE based on comparing the signal metric to a threshold related to inter-UE cross link interference.

30 Claims, 13 Drawing Sheets

(56) References Cited

U.S. PATENT DOCUMENTS

| | | | | |
|---|---|---|---|---|
| 2020/0228212 A1* | 7/2020 | Xu | ........................ | H04L 27/2602 |
| 2021/0360463 A1* | 11/2021 | Shi | ........................ | H04B 17/327 |
| 2022/0095144 A1* | 3/2022 | Ren | ........................ | H04W 72/20 |
| 2022/0104061 A1* | 3/2022 | Abedini | ............ | H04W 28/0236 |
| 2022/0110072 A1* | 4/2022 | Zhang | ................ | H04L 5/1423 |
| 2022/0183041 A1* | 6/2022 | Zhang | ........................ | H04L 5/16 |
| 2022/0407640 A1* | 12/2022 | Cao | ........................ | H04B 7/0617 |
| 2023/0133900 A1* | 5/2023 | Zhang | ................ | H04W 72/12 |
| | | | | 370/277 |
| 2023/0163906 A1* | 5/2023 | Zhang | ................ | H04W 24/08 |
| | | | | 370/252 |
| 2023/0269599 A1* | 8/2023 | Zhou | ................ | H04L 5/0051 |
| | | | | 370/329 |
| 2023/0412202 A1* | 12/2023 | Sambhwani | ......... | H04B 1/1027 |
| 2023/0412203 A1* | 12/2023 | Sambhwani | ......... | H04B 1/1027 |
| 2024/0040604 A1* | 2/2024 | Zhang | ................ | H04W 72/541 |
| 2024/0243888 A1* | 7/2024 | Ren | ........................ | H04B 17/345 |

* cited by examiner

TECHNIQUES FOR MITIGATING INTER-USER EQUIPMENT (UE) INTERFERENCE IN WIRELESS COMMUNICATIONS

FIELD OF THE DISCLOSURE

Aspects of the present disclosure relate generally to wireless communication systems, and more particularly, to techniques for mitigating interference between user equipment (UEs).

DESCRIPTION OF RELATED ART

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, such as 5G NR, devices and/or node can use full-duplex (FD) operations to transmit and receive signals in a same time period, where the FD operations may be inter-subband where transmission and reception can occur in different subbands, or intra-subband where transmission and reception can occur in the same subband (or full frequency band).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a processor, memory coupled with the processor, and instructions stored in the memory. The instructions are operable, when executed by the processor, to cause the apparatus to measure a signal metric of a downlink transmission from a victim serving network node that serves a victim user equipment (UE), and transmit or refrain from transmitting an uplink transmission to a serving network node that serves the apparatus based on comparing the signal metric to a threshold related to inter-UE cross link interference.

In another aspect, an apparatus for wireless communication is provided that includes a processor, memory coupled with the processor, and instructions stored in the memory. The instructions are operable, when executed by the processor, to cause the apparatus to measure a signal metric of a downlink control information (DCI) from an aggressor network node that schedules uplink transmission for an aggressor UE, and receive or refrain from receiving a downlink transmission from a serving network node that serves the apparatus based on comparing the signal metric to a threshold related to inter-UE cross link interference.

In another aspect, a method for wireless communication at an aggressor UE is provided that includes measuring a signal metric of a downlink transmission from a victim serving network node that serves a victim UE, and transmitting or refraining from transmitting an uplink transmission to a serving network node that serves the aggressor UE based on comparing the signal metric to a threshold related to inter-UE cross link interference.

In another aspect, a method for wireless communication at a victim UE is provided that includes measuring a signal metric of a DCI from an aggressor network node that schedules uplink transmission for an aggressor UE, and receiving or refraining from receiving a downlink transmission from a serving network node that serves the victim UE based on comparing the signal metric to a threshold related to inter-UE cross link interference.

In other aspects, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
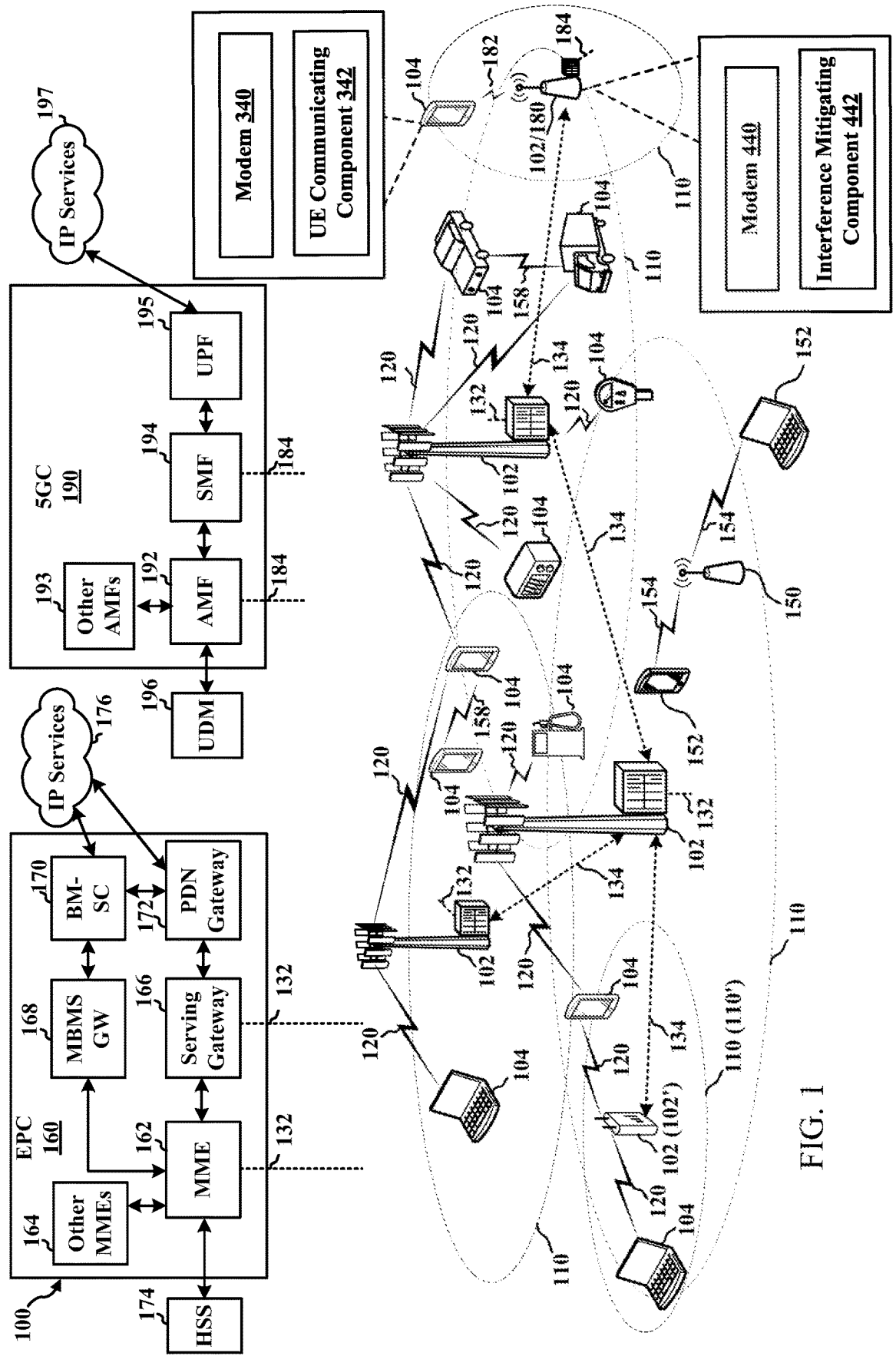
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to mitigating interference between user equipment (UEs) that are capable of full-duplex (FD) operations in a wireless network. For example, UEs in some wireless communication technologies, such as fifth generation (5G) new radio (NR), can communicate using subband non-overlapping FD, where uplink and downlink communications at the UEs can be on different subbands of an operating frequency, and/or dynamic/flexible time division duplexing (TDD), where uplink and downlink communications may use the same operating frequency band. In FD configurations, UEs can concurrently transmit and receive signals in the same slot. For example, a slot can include a time period of multiple symbols (e.g., orthogonal frequency division multiplexing (OFDM) symbols, single carrier-frequency division multiplexing (SC-FDM) symbols, etc.). Using FD in the same slot can allow for an increased uplink duty cycle (e.g., as compared to TDD communications), which can reduce latency (e.g., by making it possible to receive downlink signals in uplink slots), improve uplink coverage, enhance system capacity, enhance resource utilization, enhance spectrum efficiency, enable flexible and dynamic uplink/downlink resource adaptation according to uplink/downlink traffic in a robust manner, etc.

In using FD communications, however, the UEs, and/or network nodes with which the UEs communicate, can experience or cause intra-subband or inter-subband cross-link interference (CLI) to one another. For example, one UE transmitting to a network node may cause CLI to another UE receiving from the same or different network node in the same time periods, and/or a network node transmitting to a UE may cause CLI to another network receiving from another UE. Where different subbands are used for uplink and downlink communications, this CLI may be inter-subband, and where the same frequency band or overlapping frequency bands are used for uplink and downlink communications, this CLI may be intra-band (or intra-subband).

In accordance with aspects described herein, a UE can perform sensing to detect signals from a network node that may indicate possibility of CLI between the UE as a transmitting UE (also referred to herein as an aggressor UE) and another UE receiving the signals from the network node (also referred to herein as a victim UE. In another aspect, the victim UE can perform sensing to detect scheduling of transmissions for the aggressor UE. The UE performing the sensing can perform a mitigation process to prevent the CLI in some cases. For example, the aggressor UE can refrain from transmitting uplink signals where possibility of CLI to the victim UE is detected. In another example, the victim UE can refrain from receiving signals from a serving network node where the possibility of CLI from the aggressor UE is detected.

In any case, in these examples, UEs can mitigate CLI interference with one another in FD operations by refraining from transmitting or receiving signals in certain time periods where the possibility of CLI is detected. This can improve communication quality at the UEs, which can improve spectrum usage, resource utilization, power consumption, etc. at the UEs, which can accordingly improve user experience when using the UEs.

The described features will be presented in more detail below with reference to FIGS. 1-13.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, single carrier-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 340 and UE communicating component 342 for sensing downlink signals and performing interference mitigation, in accordance with aspects described herein. In addition, some nodes may have a modem 440 and an interference mitigating component 442 for communicating with other network nodes to mitigate UE interference, in accordance with aspects described herein. Though a UE 104 is shown as having the modem 340 and UE communicating component 342 and a base station 102/gNB 180 is shown as having the modem 440 and interference mitigating component 442, this is one illustrative example, and substantially any node or type of node may include a modem 340 and UE communicating component 342 and/or a modem 440 and interference mitigating component 442 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, head compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS, e.g., BS 102), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In an example, one UE 104 operating in FD can interfere with another UE 104 operating in FD, including CLI where downlink transmissions to one UE 104 from a base station 102 can interfere with uplink transmissions transmitted by another UE 104 to another base station 102. In one example, the UEs 104 can include a UE communicating component 342 for sensing possible CLI related to downlink transmissions from a base station to one UE 104 and uplink transmissions from another UE 104 to the same or different base station 102. UE communicating component 342 can mitigate the CLI by determining whether or not to transmit the uplink communications to the base station 102, whether or not to receive the downlink communications from the base station 102, etc., as described herein. In addition, an interference mitigating component 442 of one or more base stations 102 can indicate, to other base stations 102, resources over which CLI between UEs is possible, and/or can transmit downlink transmissions or uplink grants based on the possible CLI.

Figure 2:
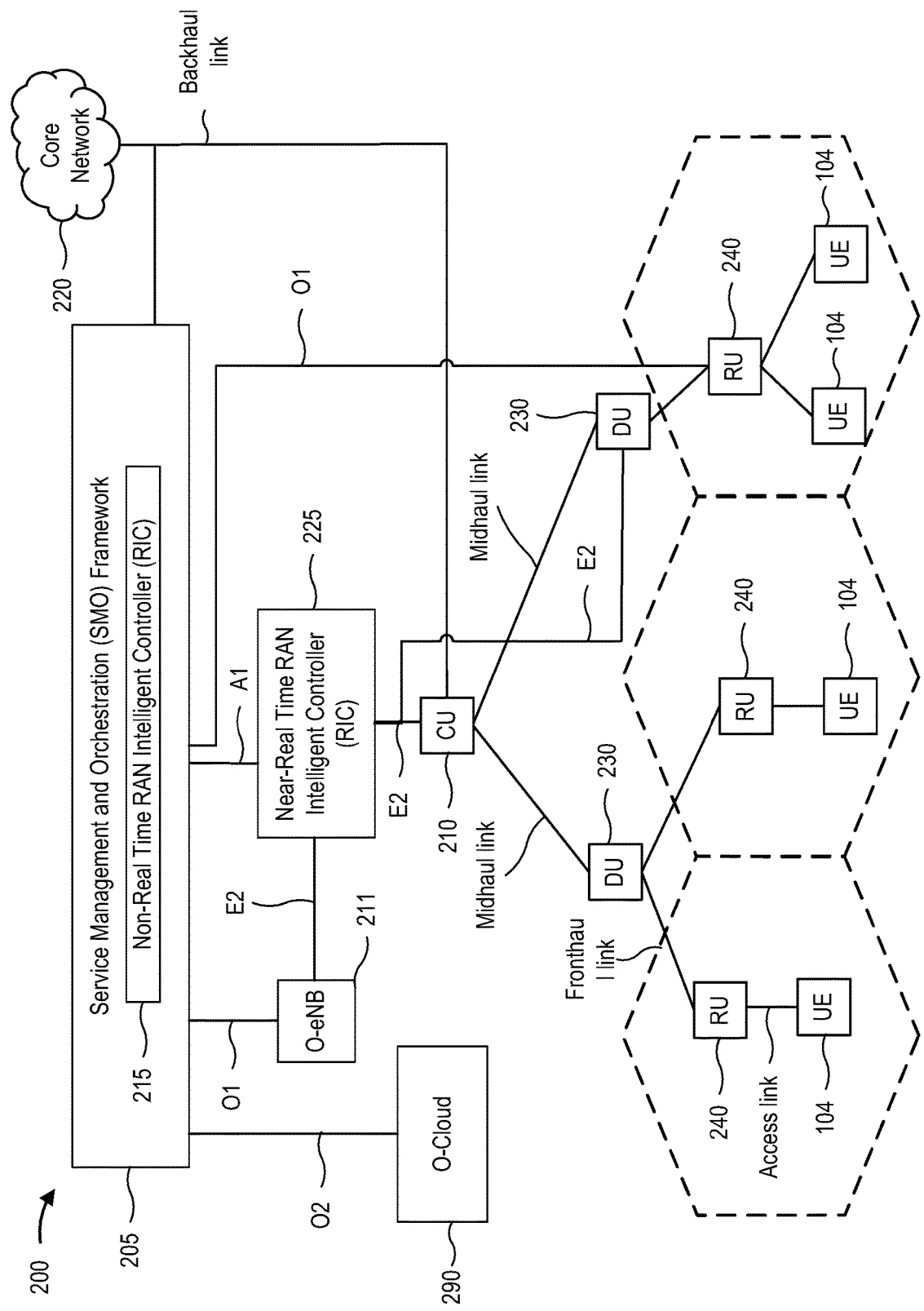
FIG. 2 is a diagram illustrating an example of disaggregated base station architecture, in accordance with various aspects of the present disclosure.

FIG. 2 shows a diagram illustrating an example of disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) MC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

In an example, interference mitigating component 442, as described herein, can be at least partially implemented within one or more DUs 230 to mitigating CLI among UEs. In one example, a victim DU 230 that serves a victim UE can include the interference mitigating component 442 to indicate resources over which the victim UE is scheduled to receive transmissions from the victim DU 230, and an aggressor DU 230 can refrain from scheduling an aggressor UE for uplink transmission over the resources. In another example, an aggressor DU 230 that serves an aggressor UE can include the interference mitigating component 442 to indicate resources over which the aggressor UE is scheduled to transmit uplink communications to the aggressor DU 230, and a victim DU 230 can refrain from scheduling a victim UE to receive downlink transmissions from the victim DU 230 over the resources. In accordance with some aspects described herein, parameters or indications related to interference mitigation can be communicated between DUs 230 using F1 signaling between DUs 230 where the DUs have the same CU 210. In another example, the parameters or indications related to interference mitigation can be communicated between DUs 230 using F1 and Xn signaling between DUs 230 where the DUs have different CUs 210 (e.g., Xn between the CUs 210 and F1 from the respective DU 210 to DU 230).

Turning now to FIGS. 3-13, aspects are depicted with reference to one or more components and one or more methods that may perform the actions or operations described herein, where aspects in dashed line may be optional. Although the operations described below in FIGS. 5-10 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Figure 3:
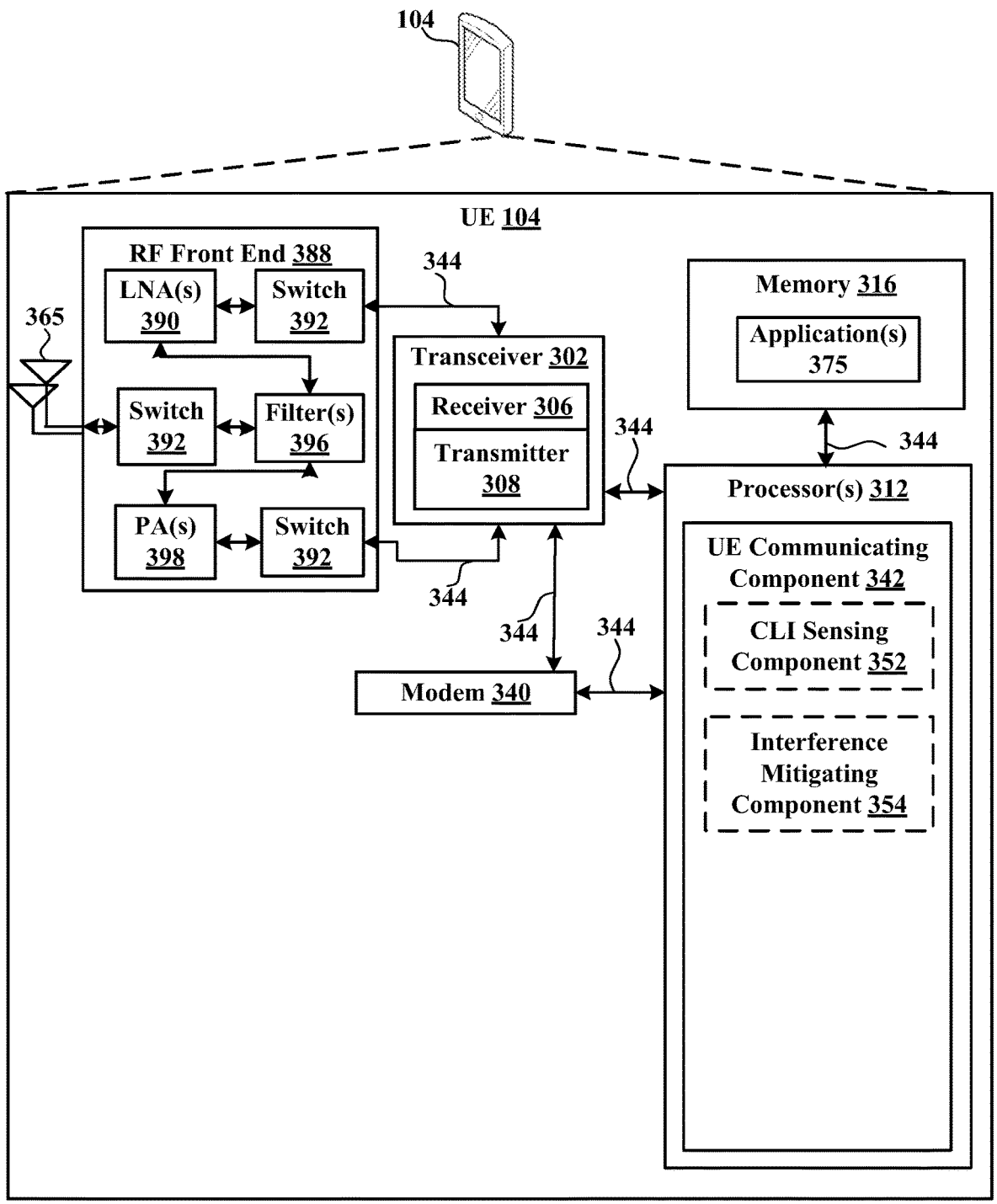
FIG. 3 is a block diagram illustrating an example of a user equipment (UE), in accordance with various aspects of the present disclosure.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 340 and/or UE communicating component 342 for sensing downlink signals and performing interference mitigation, in accordance with aspects described herein.

In an aspect, the one or more processors 312 can include a modem 340 and/or can be part of the modem 340 that uses one or more modem processors. Thus, the various functions related to UE communicating component 342 may be included in modem 340 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 340 associated with UE communicating component 342 may be performed by transceiver 302.

Also, memory 316 may be configured to store data used herein and/or local versions of applications 375 or UE communicating component 342 and/or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining UE communicating component 342 and/or one or more of its subcomponents, and/or data associated therewith, when UE 104 is operating at least one processor 312 to execute UE communicating component 342 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one base station 102. Additionally, receiver 306 may process such received signals, and also may obtain measurements of the signals, such as, but not limited to, Ec/Io, signal-to-noise ratio (SNR), reference signal received power (RSRP), received signal strength indicator (RSSI), etc. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, UE 104 may include RF front end 388, which may operate in communication with one or more antennas 365 and transceiver 302 for receiving and transmitting radio transmissions, for example, wireless communications transmitted by at least one base station 102 or wireless transmissions transmitted by UE 104. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that UE 104 can communicate with, for example, one or more base stations 102 or one or more cells associated with one or more base stations 102. In an aspect, for example, modem 340 can configure transceiver 302 to operate at a specified frequency and power level based on the UE configuration of the UE 104 and the communication protocol used by modem 340.

In an aspect, modem 340 can be a multiband-multimode modem, which can process digital data and communicate with transceiver 302 such that the digital data is sent and received using transceiver 302. In an aspect, modem 340 can be multiband and be configured to support multiple frequency bands for a specific communications protocol. In an aspect, modem 340 can be multimode and be configured to support multiple operating networks and communications protocols. In an aspect, modem 340 can control one or more components of UE 104 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 342 can optionally include a CLI sensing component 352 for sensing signals from network nodes that may indicate possibility of CLI between the UE 104 and another UE, and/or an interference mitigating component 354 for mitigating the possible CLI between the UE 104 and another UE, in accordance with aspects described herein.

In an aspect, the processor(s) 312 may correspond to one or more of the processors described in connection with the UE in FIG. 13. Similarly, the memory 316 may correspond to the memory described in connection with the UE in FIG. 13.

Figure 4:
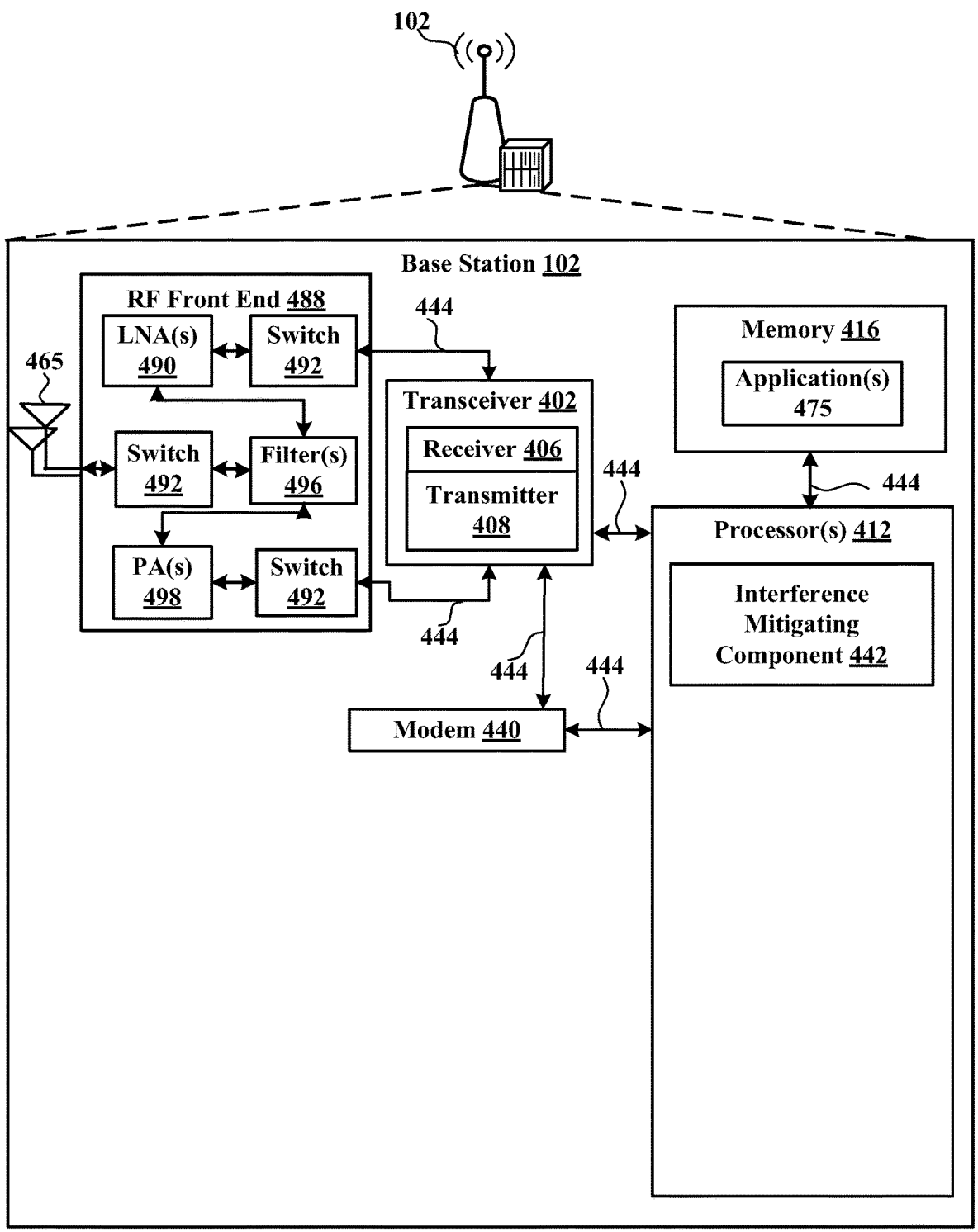
FIG. 4 is a block diagram illustrating an example of a base station, in accordance with various aspects of the present disclosure.

Referring to FIG. 4, one example of an implementation of base station 102 (e.g., a base station 102 and/or gNB 180, as described above) may include a variety of components, some of which have already been described above, but including components such as one or more processors 412 and memory 416 and transceiver 402 in communication via one or more buses 444, which may operate in conjunction with modem 440 and an interference mitigating component 442 for communicating with other network nodes to mitigate UE interference, in accordance with aspects described herein.

The transceiver 402, receiver 406, transmitter 408, one or more processors 412, memory 416, applications 475, buses 444, RF front end 488, LNAs 490, switches 492, filters 496, PAs 498, and one or more antennas 465 may be the same as or similar to the corresponding components of UE 104, as described above, but configured or otherwise programmed for base station operations as opposed to UE operations.

In an aspect, the processor(s) 412 may correspond to one or more of the processors described in connection with the base station in FIG. 13. Similarly, the memory 416 may correspond to the memory described in connection with the base station in FIG. 13.

Figure 5:
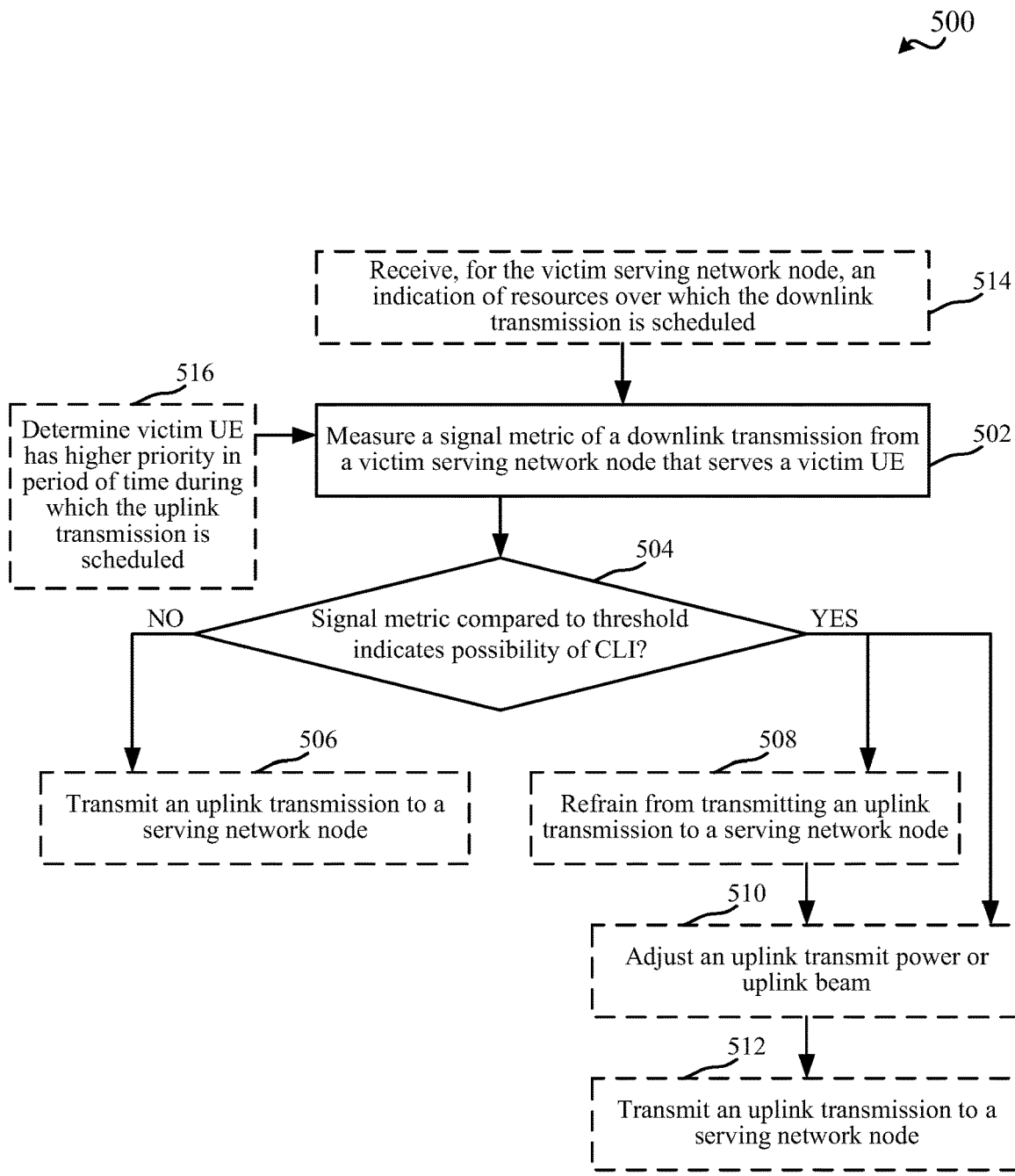
FIG. 5 is a flow chart illustrating an example of a method for transmitting or refraining from transmitting uplink communications based on sensing downlink signals, in accordance with aspects described herein.

FIG. 5 illustrates a flow chart of an example of a method 500 for transmitting or refraining from transmitting uplink communications based on sensing downlink signals, in accordance with aspects described herein. In an example, a UE 104 operating as an aggressor UE, can perform the functions described in method 500 using one or more of the components described in FIGS. 1 and 3.

In method 500, at Block 502, a signal metric of a downlink transmission from a victim serving network node that serves a victim UE can be measured. In an aspect, CLI sensing component 352, e.g., in conjunction with processor(s) 312, memory 316, transceiver 302, UE communicating component 342, etc., of an aggressor UE, can measure the signal metric of the downlink transmission from the victim serving network node that serves a victim UE. In one example, the victim serving network node may also serve the aggressor UE, or the aggressor UE may be served by a different serving network node, as described above. In any case, for example, CLI sensing component 352 can sense and measure downlink signals received from the victim serving network node to detect possible CLI that the aggressor UE may cause to a victim UE if it transmits uplink signals in a similar time period over which the victim UE receives downlink signals from the victim serving network node. For example, CLI sensing component 352 can sense substantially any downlink signal from the victim serving network node, such as a broadcast signal, a reference signal, a data signal, a DCI scheduling a subsequent downlink transmission, etc., which may include receiving and the signal via a receiver (e.g., transceiver 302) and measuring the signal metric, such as a signal strength or quality (e.g., RSSI, RSRP, RSRQ, SNR, etc.). Sensing the downlink transmission, for example, can be indicative of possible CLI to another UE (the victim UE) that may occur within a sub-band (e.g., intra-sub-band) in sub-band FD communications between the victim UE and the victim serving network node, or may occur in adjacent sub-bands or sub-bands near one another in inter-sub-band FD communications.

In method 500, at Block 504, the signal metric can be compared to a threshold that indicates possibility of CLI. In an aspect, CLI sensing component 352, e.g., in conjunction with processor(s) 312, memory 316, transceiver 302, UE communicating component 342, etc., of an aggressor UE, can compare the signal metric to the threshold that indicates possibility of CLI with another UE (a victim UE). In one example, CLI sensing component 352 can receive the threshold in a configuration from a network node (e.g., a serving network node).

If the signal metric compared to the threshold does not indicate possibility of CLI (e.g., if the signal metric is less than the threshold), optionally at Block 506, an uplink transmission can be transmitted to a serving network node. In an aspect, UE communicating component 342, e.g., in conjunction with processor(s) 312, memory 316, transceiver 302, etc., of an aggressor UE, can transmit the uplink transmission to the serving network node (e.g., an aggressor serving network node, which may the same or different than the victim serving network node). For example, UE communicating component 342 can transmit the uplink transmission in a similar time period as the downlink transmission is transmitted to the victim UE, in the same or overlapping or adjacent sub-band, etc., as described, as the signal metric comparison does not indicate possibility of CLI (or at least CLI at a prohibitive level).

In one example, if the signal metric compared to the threshold does indicate possibility of CLI (e.g., if the signal metric achieves the threshold), optionally at Block 508, transmitting an uplink transmission to a serving network node can be refrained from. In an aspect, interference mitigating component 354, e.g., in conjunction with processor(s) 312, memory 316, transceiver 302, UE communicating component 342, etc., of an aggressor UE, can refrain from transmitting the uplink transmission to the serving network node (e.g., an aggressor serving network node, which may the same or different than the victim serving network node). This can mitigate the possible CLI that may be caused by transmitting the uplink transmission in a similar time period as the downlink transmission is transmitted to the victim UE, in the same or overlapping or adjacent sub-band, etc., as described.

In another example, interference mitigating component 354 may perform other mitigation process to prevent the possible CLI. For example, if the signal metric compared to the threshold does indicate possibility of CLI (e.g., if the signal metric achieves the threshold), optionally at Block 510, an uplink transmit power or uplink beam can be adjusted. In an aspect, interference mitigating component 354, e.g., in conjunction with processor(s) 312, memory 316, transceiver 302, UE communicating component 342, etc., of an aggressor UE, can adjust the uplink transmit power or the uplink beam. For example, interference mitigating component 354 can decrease the uplink transmit power (e.g., by an amount proportional to the signal metric or a difference between the signal metric and the threshold). In another example, interference mitigating component 354 can change the uplink beam direction so as to lessen the possible CLI to the victim UE, which may include selecting a beam with a next highest SNR with the serving network node that serves the aggressor UE.

In any case, in these examples, optionally at Block 512, an uplink transmission can be transmitted to a serving network node. In an aspect, UE communicating component 342, e.g., in conjunction with processor(s) 312, memory 316, transceiver 302, etc., of an aggressor UE, can transmit the uplink transmission to the serving network node (e.g., an aggressor serving network node, which may the same or different than the victim serving network node). The uplink transmission may not exhibit the possible CLI (or may exhibit CLI at a lower level) based on decreasing the transmit power or modifying the beam.

In method 500, optionally at Block 514, an indication of resources over which the downlink transmission is scheduled can be received for the victim serving network node. In an aspect, CLI sensing component 352, e.g., in conjunction with processor(s) 312, memory 316, transceiver 302, UE communicating component 342, etc., of an aggressor UE, can receive, for the victim serving network node, the indication of resources over which the downlink transmission is scheduled. In one example, as described further herein, the victim serving network node can communicate the indication of resources to the aggressor serving network node, and the aggressor UE can receive the indication from its serving network node. In an example, CLI sensing component 352 can sense the downlink transmission over the indicated resources.

In method 500, optionally at Block 516, it can be determined that the victim UE has a higher priority in a period of time during which the uplink transmission is scheduled. In an aspect, CLI sensing component 352, e.g., in conjunction with processor(s) 312, memory 316, transceiver 302, UE communicating component 342, etc., of an aggressor UE, can determine the victim UE has higher priority in the period of time during which the uplink transmission is scheduled. In an example, CLI sensing component 352 can measure the signal metric of the downlink transmission based on the determination that the victim UE has higher priority than the aggressor UE in the period of time, and thus the aggressor UE may otherwise cause the CLI, as described above. In one example, the serving network node for the aggressor UE can configure the aggressor UE with an indication of priority in certain periods of time (e.g., over certain symbols, slots, etc.).

Figure 6:
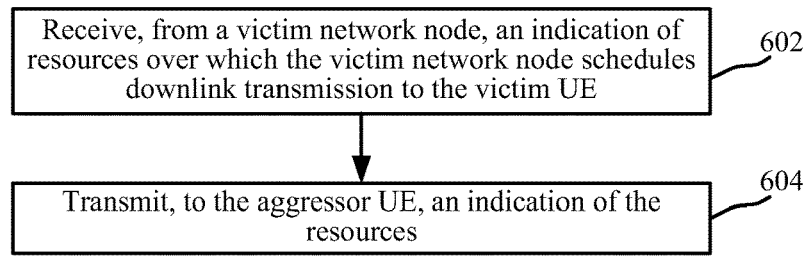
FIG. 6 is a flow chart illustrating an example of a method for transmitting an indication of resources scheduled for downlink transmissions, in accordance with aspects described herein.
Figure 7:
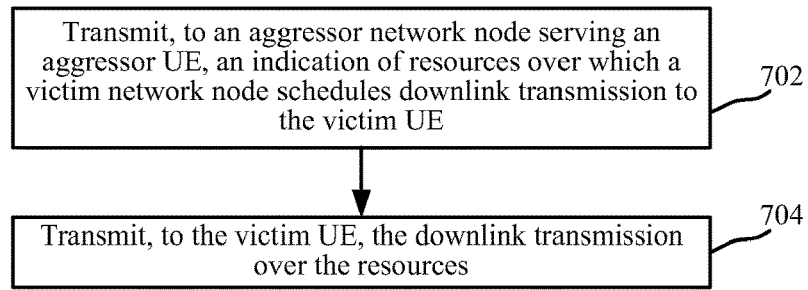
FIG. 7 is a flow chart illustrating an example of a method for receiving an indication of resources scheduled for downlink transmissions, in accordance with aspects described herein.

FIG. 6 illustrates a flow chart of an example of a method 600 for transmitting an indication of resources scheduled for downlink transmissions, in accordance with aspects described herein. FIG. 7 illustrates a flow chart of an example of a method 700 for receiving an indication of resources scheduled for downlink transmissions, in accordance with aspects described herein. In an example, a first network node, such as a base station 102 or gNB, or portion of a disaggregated base station 102 or gNB, etc., operating as an aggressor network node, can perform the functions described in method 600 using one or more of the components described in FIGS. 1 and 4. In an example, a second network node, such as a base station 102 or gNB, or portion of a disaggregated base station 102 or gNB, etc., operating as a victim network node, can perform the functions described in method 700 using one or more of the components described in FIGS. 1 and 4. Though methods 600 and 700 are described in conjunction with one another for ease of explanation, the methods are not required to be performed in conjunction, and different network nodes can, or can be configured to, independently perform the different methods.

In method 700, at Block 702, an indication of resources over which a victim network node schedules downlink transmission to a victim UE can be transmitted to an aggressor network node serving an aggressor UE. In an aspect, interference mitigating component 442, e.g., in conjunction with processor(s) 412, memory 416, transceiver 402, etc., of a victim network node can transmit, to an aggressor network node serving an aggressor UE, an indication of resources over which the victim network node schedules downlink transmission to the victim UE. The interference mitigating component 442 of the victim network node, in this example, can transmit the indication via BH or OTA signaling from the victim network node to the aggressor network node. As described, for example, this can include transmitting using F1 signaling (e.g., where the network nodes are DUs having a same CU) or using F1 and Xn signaling (where the DUs have different CUs).

In method 600, at Block 602, an indication of resources over which the victim network node schedules downlink transmission to the victim UE can be received. In an aspect, interference mitigating component 442, e.g., in conjunction with processor(s) 412, memory 416, transceiver 402, etc., of an aggressor network node can receive, from the victim network node, the indication of resources over which the victim network node schedules downlink transmission to the victim UE. The interference mitigating component 442 of the aggressor network node, in this example, can receive the indication via BH or OTA signaling from the victim network node.

In method 600, at Block 604, an indication of the resources can be transmitted to the aggressor UE. In an aspect, interference mitigating component 442, e.g., in conjunction with processor(s) 412, memory 416, transceiver 402, etc., of an aggressor network node can transmit, to the aggressor UE, the indication of the resources. For example, the aggressor network node can transmit the indication of resources in downlink control information to the aggressor UE that it serves, so that the aggressor UE can sense the downlink transmissions for performing CLI sensing and interference mitigation, as described herein.

In method 700, at Block 704, the downlink transmission can be transmitted to the victim UE over the resources. In an aspect, transceiver 402, e.g., in conjunction with processor(s) 412, memory 416, transceiver 402, etc., of a victim network node can transmit, to the victim UE, the downlink transmission over the resources. For example, the aggressor UE can sense the downlink transmissions for perform CLI sensing and interference mitigation, as described herein.

Figure 8:
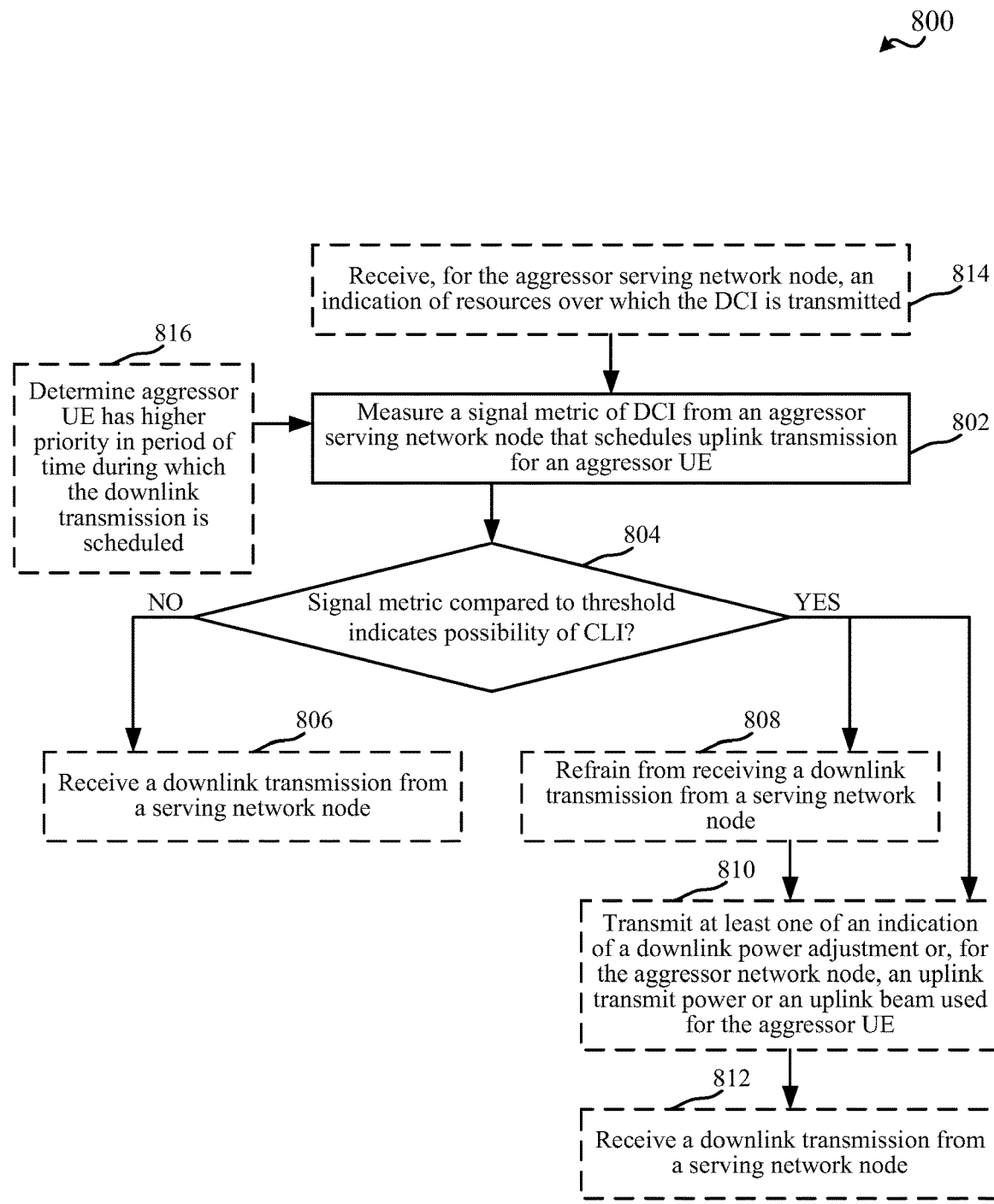
FIG. 8 is a flow chart illustrating an example of a method for receiving or refraining from receiving downlink communications based on sensing downlink control information (DCI), in accordance with aspects described herein.

FIG. 8 illustrates a flow chart of an example of a method 800 for receiving or refraining from receiving downlink communications based on sensing DCI, in accordance with aspects described herein. In an example, a UE 104 operating as a victim UE, can perform the functions described in method 800 using one or more of the components described in FIGS. 1 and 3.

In method 800, at Block 802, a signal metric of DCI from an aggressor serving network node that schedules uplink transmission for an aggressor UE can be measured. In an aspect, CLI sensing component 352, e.g., in conjunction with processor(s) 312, memory 316, transceiver 302, UE communicating component 342, etc., of a victim UE, can measure the signal metric of the DCI from the aggressor serving network node that schedules the uplink transmission for the aggressor UE. In one example, the aggressor serving network node may also serve the victim UE, or the victim UE may be served by a different serving network node, as described above. In any case, for example, CLI sensing component 352 can sense and measure DCI received from the aggressor serving network node to detect possible CLI that the aggressor UE may cause to a victim UE if the victim UE receives downlink signals in a similar time period over which the aggressor UE transmits uplink signals to the aggressor serving network node. For example, CLI sensing component 352 can sense the DCI that schedules the aggressor UE with uplink resources in a subsequent period of time. Sensing the DCI, for example, can be indicative of possible CLI from the aggressor UE that may occur within a sub-band (e.g., intra-sub-band) in sub-band FD communications between the aggressor UE and the aggressor serving network node, or may occur in adjacent sub-bands or sub-bands near one another in inter-sub-band FD communications.

In method 800, at Block 804, the signal metric can be compared to a threshold that indicates possibility of CLI. In an aspect, CLI sensing component 352, e.g., in conjunction with processor(s) 312, memory 316, transceiver 302, UE communicating component 342, etc., of a victim UE, can compare the signal metric to the threshold that indicates possibility of CLI from another UE (an aggressor UE). In one example, CLI sensing component 352 can receive the threshold in a configuration from a network node (e.g., a serving network node).

If the signal metric compared to the threshold does not indicate possibility of CLI (e.g., if the signal metric is less than the threshold), optionally at Block 806, a downlink transmission can be received from a serving network node. In an aspect, UE communicating component 342, e.g., in conjunction with processor(s) 312, memory 316, transceiver 302, etc., of a victim UE, can receiving the downlink transmission from the serving network node (e.g., a victim serving network node, which may the same or different than the aggressor serving network node). For example, UE communicating component 342 can receive the downlink transmission in a similar time period as the uplink transmission is transmitted by the aggressor UE that is scheduled by the DCI, in the same or overlapping or adjacent sub-band, etc., as described, as the signal metric comparison does not indicate possibility of CLI (or at least CLI at a prohibitive level).

In one example, if the signal metric compared to the threshold does indicate possibility of CLI (e.g., if the signal metric achieves the threshold), optionally at Block 808, receiving a downlink transmission from a serving network node can be refrained from. In an aspect, interference mitigating component 354, e.g., in conjunction with processor(s) 312, memory 316, transceiver 302, UE communicating component 342, etc., of a victim UE, can refrain from receiving the downlink transmission from the serving network node (e.g., a victim serving network node, which may the same or different than the aggressor serving network node). For example, interference mitigating component 354 can refrain from receiving the downlink transmission in a period of time (e.g., symbol, slot, etc.) corresponding to the uplink transmission of the aggressor UE scheduled by the DCI received from the aggressor network node. This can mitigate the possible CLI that may be caused by receiving the downlink transmission in a similar time period as the uplink transmission is transmitted by the aggressor UE, in the same or overlapping or adjacent sub-band, etc., as described.

In another example, interference mitigating component 354 may perform other mitigation process to prevent the possible CLI. For example, if the signal metric compared to the threshold does indicate possibility of CLI (e.g., if the signal metric achieves the threshold), optionally at Block 810, at least one of an indication of a downlink power adjustment or, for the aggressor network node, an uplink transmit power or an uplink beam used for the aggressor UE can be transmitted. In an aspect, interference mitigating component 354, e.g., in conjunction with processor(s) 312, memory 316, transceiver 302, UE communicating component 342, etc., of a victim UE, can transmit at least one of the indication of the downlink power adjustment or, for the aggressor network node, the uplink transmit power or the uplink beam used for the aggressor UE. For example, interference mitigating component 354 can transmit the indication of downlink power adjustment to the victim serving network node to increase the downlink transmit power (e.g., by an amount proportional to the signal metric or a difference between the signal metric and the threshold) to lessen the CLI from the aggress UE. In another example, interference mitigating component 354 can transmit the indication of uplink transmit power or uplink beam for the aggressor UE to the victim serving network node for providing the aggressor serving network node to effectuate modification at the aggressor UE. For example, interference mitigating component 354 can indicate the uplink power as a power or power adjustment (e.g., by an amount proportional to the signal metric or a difference between the signal metric and the threshold). In another example, interference mitigating component 354 can indicate or request a change in the uplink beam direction so as to lessen the possible CLI to the victim UE. In an example, interference mitigating component 354 can specify the beam or request a change for the aggress UE to a beam with a next highest SNR with the aggressor serving network node that serves the aggressor UE.

In any case, in these examples, optionally at Block 812, a downlink transmission can be received from a serving network node. In an aspect, UE communicating component 342, e.g., in conjunction with processor(s) 312, memory 316, transceiver 302, etc., of a victim UE, can receive the downlink transmission from the serving network node (e.g., a victim serving network node, which may the same or different than the aggressor serving network node). The downlink transmission may not exhibit the possible CLI (or may exhibit CLI at a lower level) based on increasing the downlink transmit power, the aggressor UE decreasing its uplink transmit power or modifying the uplink beam, etc.

In method 800, optionally at Block 814, an indication of resources over which the DCI is transmitted can be received for the aggressor serving network node. In an aspect, CLI sensing component 352, e.g., in conjunction with processor(s) 312, memory 316, transceiver 302, UE communicating component 342, etc., of a victim UE, can receive, for the aggressor serving network node, the indication of resources over which the DCI is transmitted. In one example, as described further herein, the aggressor serving network node can communicate the indication of resources to the victim serving network node, and the victim UE can receive the indication from its serving network node. In an example, CLI sensing component 352 can sense the DCI over the indicated resources.

In method 800, optionally at Block 816, it can be determined that the aggressor UE has a higher priority in a period of time during which the downlink transmission is scheduled. In an aspect, CLI sensing component 352, e.g., in conjunction with processor(s) 312, memory 316, transceiver 302, UE communicating component 342, etc., of an aggressor UE, can determine the aggressor UE has higher priority in the period of time during which the downlink transmission is scheduled by the DCI. In an example, CLI sensing component 352 can measure the signal metric of the DCI based on the determination that the aggressor UE has higher priority than the victim UE in the period of time, and thus the aggressor UE may otherwise cause the CLI, as described above. In one example, the serving network node for the victim UE can configure the victim UE with an indication of priority in certain periods of time (e.g., over certain symbols, slots, etc.).

Figure 9:
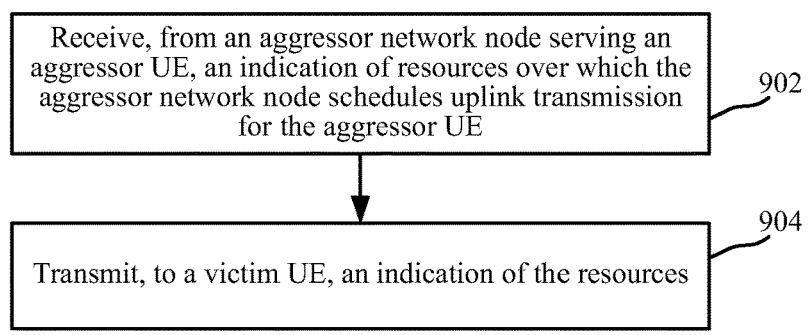
FIG. 9 is a flow chart illustrating an example of a method for receiving an indication of resources over which uplink transmissions are scheduled, in accordance with aspects described herein.
Figure 10:
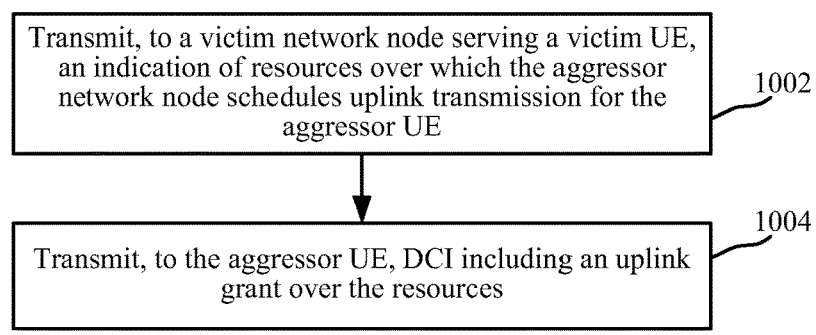
FIG. 10 is a flow chart illustrating an example of a method for transmitting an indication of resources over which uplink transmissions are scheduled, in accordance with aspects described herein.

FIG. 9 illustrates a flow chart of an example of a method 900 for receiving an indication of resources over which uplink transmissions are scheduled, in accordance with aspects described herein. FIG. 10 illustrates a flow chart of an example of a method 1000 for transmitting an indication of resources over which uplink transmissions are scheduled, in accordance with aspects described herein. In an example, a first network node, such as a base station 102 or gNB, or portion of a disaggregated base station 102 or gNB, etc., operating as an aggressor network node, can perform the functions described in method 900 using one or more of the components described in FIGS. 1 and 4. In an example, a second network node, such as a base station 102 or gNB, or portion of a disaggregated base station 102 or gNB, etc., operating as a victim network node, can perform the functions described in method 1000 using one or more of the components described in FIGS. 1 and 4. Though methods 900 and 1000 are described in conjunction with one another for ease of explanation, the methods are not required to be performed in conjunction, and different network nodes can, or can be configured to, independently perform the different methods.

In method 1000, at Block 1002, an indication of resources over which an aggressor network node schedules uplink transmission for an aggressor UE can be transmitted to a victim network node serving a victim UE. In an aspect, interference mitigating component 442, e.g., in conjunction with processor(s) 412, memory 416, transceiver 402, etc., of an aggressor network node can transmit, to a victim network node serving a victim UE, an indication of resources over which the aggressor network node schedules uplink transmission for the aggressor UE UE. The interference mitigating component 442 of the aggressor network node, in this example, can transmit the indication via BH or OTA signaling from the aggressor network node to the victim network node. As described, for example, this can include transmitting using F1 signaling (e.g., where the network nodes are DUs having a same CU) or using F1 and Xn signaling (where the DUs have different CUs).

In method 900, at Block 902, an indication of resources over which the aggressor network node schedules uplink transmission for the aggressor UE can be received from the aggressor network node serving the aggressor UE. In an aspect, interference mitigating component 442, e.g., in conjunction with processor(s) 412, memory 416, transceiver 402, etc., of a victim network node can receive, from the aggressor network node serving the aggressor UE, the indication of resources over which the aggressor network node schedules uplink transmission for the aggressor UE. The interference mitigating component 442 of the victim network node, in this example, can receive the indication via BH or OTA signaling from the aggressor network node.

In method 900, at Block 904, an indication of the resources can be transmitted to the victim UE. In an aspect, interference mitigating component 442, e.g., in conjunction with processor(s) 412, memory 416, transceiver 402, etc., of a victim network node can transmit, to the victim UE, the indication of the resources. For example, the victim network node can transmit the indication of resources in downlink control information to the victim UE that it serves, so that the victim UE can sense DCI from the aggressor network node over the resources for performing CLI sensing and interference mitigation, as described herein.

In method 1000, at Block 1004, an uplink grant can be transmitted in DCI to the aggressor UE over the resources. In an aspect, transceiver 402, e.g., in conjunction with processor(s) 412, memory 416, transceiver 402, etc., of an aggressor network node can transmit, to the aggressor UE, DCI including the uplink grant over the resources. For example, the victim UE can sense the downlink transmissions for perform CLI sensing and interference mitigation, as described herein.

Figure 11:
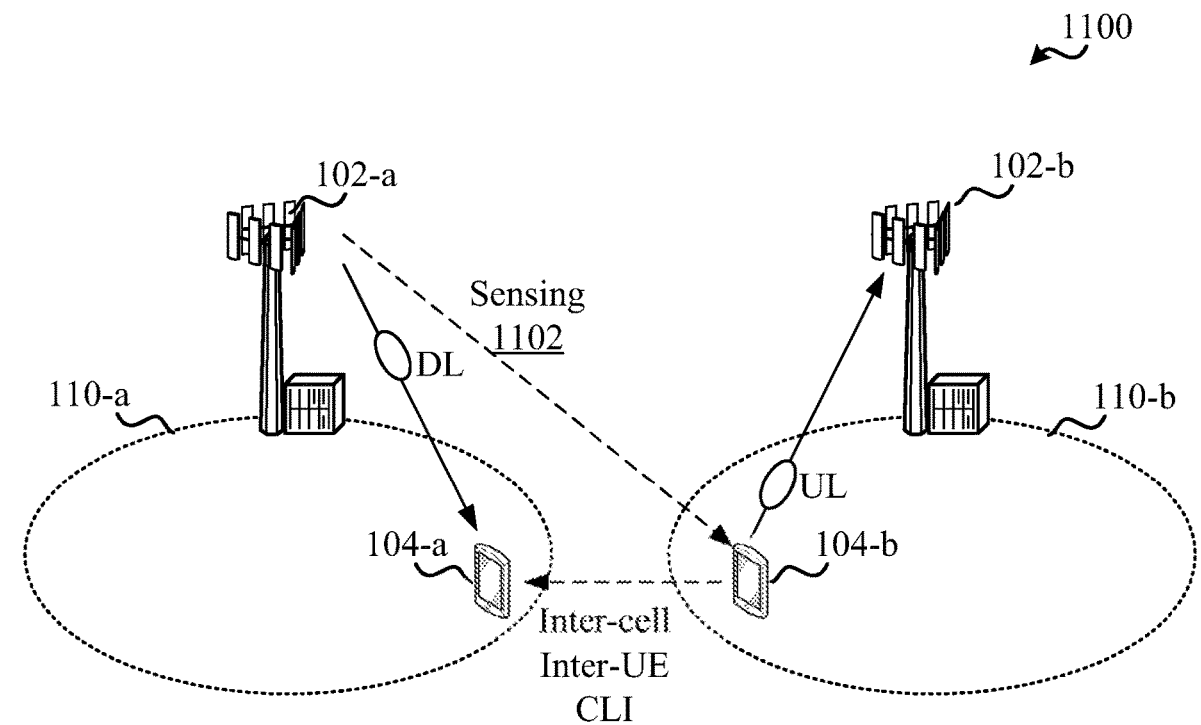
FIG. 11 illustrates an example of a wireless communication system with possible CLI between UEs, in accordance with aspects described herein.

FIG. 11 illustrates an example of a wireless communication system 1100 with possible CLI between UEs, in accordance with aspects described herein. Wireless communication system 1100 includes base station 102-*a* and 102-*b*, which can provide respective cells 110-*a* and 110-*b*. Wireless communication system 1100 also includes a UE 104-*a* communicating with base station 102-*a* in cell 110-*a*, and UE 104-*b* communicating with base station 102-*b* in cell 110-*b*. In this example, base station 102-*a* can transmit downlink signals to UE 104-*a*, and base station 102-*b* can receive uplink signals from UE 104-*b* in the same or similar (e.g., overlapping) time and/or frequency resources, and the base stations 102-*a* and 102-*b* may support FD. In this example, UE 104-*b* transmission of uplink signals to base station 102-*b* may cause inter-UE CLI to downlink transmissions from base station 102-*a* received by UE 104-*a*.

In examples described herein, the inter-UE CLI and/or inter-cell inter-UE CLI can be sensed and mitigated. For example, UE 104-*b* can be the aggressor UE and UE 104-*a* can be the victim UE. In the example of wireless communication system 1100, the aggressor UE 104-*b* can perform sensing 1102 on downlink signals transmitted by the victim base station 102-*a* to the victim UE 104-*a*. The aggressor UE 104-*b* can accordingly determine whether or not to transmit uplink transmissions to aggressor base station 102-*b* in certain periods of time where it may cause CLI to downlink transmissions to the UE 104-*a*, as described herein.

For example, the aggressor UE 104-*b* can to sense any downlink transmission from its serving gNB (for SBFD) or from neighbor gNB (for dynamic TDD), which can serve a victim UE 104-*a*. The sensing can provide an estimated CLI. This may occur where the victim UE 104-*a* has higher priority, e.g. on victim UE's RRC-configured downlink symbol. To help with sensing, for dynamic TDD, the base station 102-*a* serving the victim UE 104-*a* may inform the base station 102-*b* serving the aggressor UE 104-*b* of the DL scheduled transmission occasions (e.g., periodic or aperiodic physical downlink control channel (PDCCH) occasions) via BH (such as Xn and/or F1) or OTA signaling. Then the base station 102-*b* serving the aggressor UE 104-*b* can signal the aggressor UE 104-*b* of the DL scheduled transmission occasions of the base station 102-*a* serving the victim UE 104-*a*.

In this example, an estimated method for aggressor UE 104-*b* to sense about inter-UE CLI level before the actual uplink transmission may include the aggressor UE 104-*b* measuring the DCI scheduling DL traffic for the victim UE 104-*a*, where a rule can define UE that only measured RSSI or RSRP of DCI less than a threshold, then aggressor UE 104-*b* may transmit UL for the scheduled physical downlink shared channel (PDSCH) symbols/slots of victim UE 104-*a*. The DL is scheduled by the measured DCI of victim base station 102-*a* serving the victim UE 104-*a*, which is decoded by the aggressor UE 104-*b*. Otherwise, aggressor UE 104-*b* may not transmit the UL traffic on the scheduled PDSCH symbols/slots of victim UE's DL reception occasions. In another example, the aggressor UE 104-*b* can adjust UL transmit power or beam adjustment on the scheduled PDSCH symbols/slots of victim UE's DL reception occasions. Other solutions may also apply to help inter-UE CLI reduction.

Figure 12:
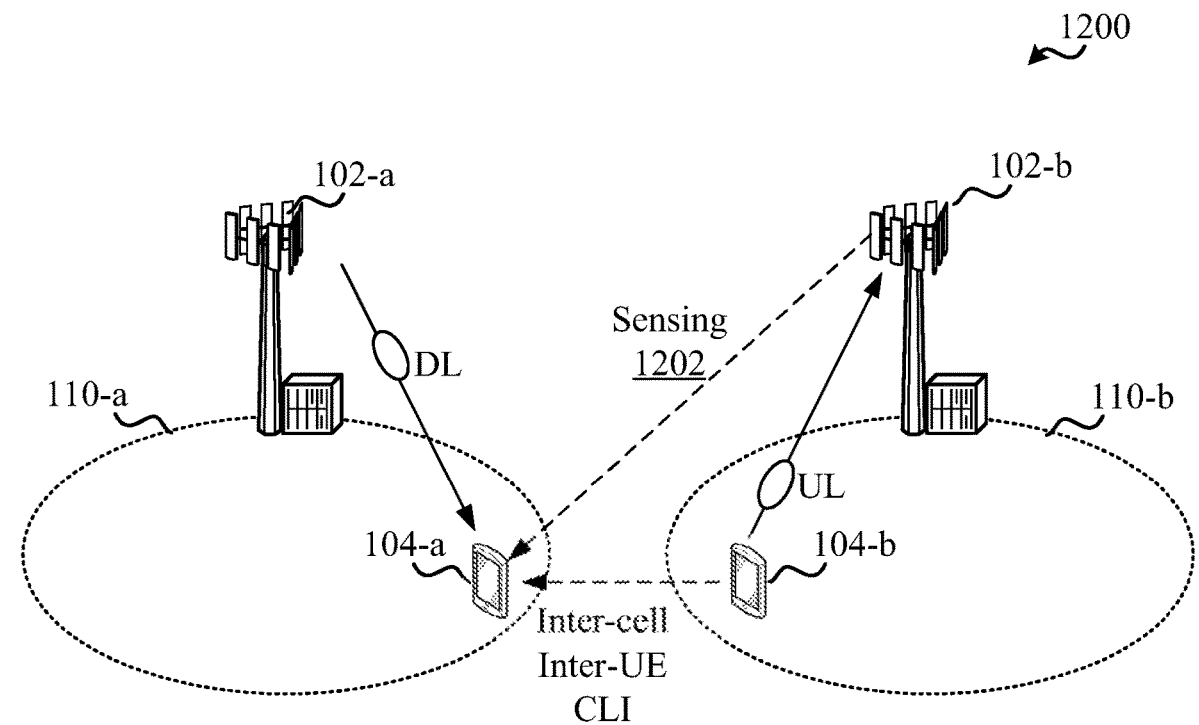
FIG. 12 illustrates another example of a wireless communication system with possible CLI between UEs, in accordance with aspects described herein.

FIG. 12 illustrates an example of a wireless communication system 1200 with possible CLI between UEs, in accordance with aspects described herein. Wireless communication system 1100 includes base station 102-*a* and 102-*b*, which can provide respective cells 110-*a* and 110-*b*. Wireless communication system 1200 also includes a UE 104-*a* communicating with base station 102-*a* in cell 110-*a*, and UE 104-*b* communicating with base station 102-*b* in cell 110-*b*. In this example, base station 102-*a* can transmit downlink signals to UE 104-*a*, and base station 102-*b* can receive uplink signals from UE 104-*b* in the same or similar (e.g., overlapping) time and/or frequency resources, and the base stations 102-*a* and 102-*b* may support FD. In this example, UE 104-*b* transmission of uplink signals to base station 102-*b* may cause inter-UE CLI to downlink transmissions from base station 102-*a* received by UE 104-*a*.

In examples described herein, the inter-UE CLI and/or inter-cell inter-UE CLI can be sensed and mitigated. For example, UE 104-*b* can be the aggressor UE and UE 104-*a* can be the victim UE. In the example of wireless communication system 1200, the victim UE 104-*a* can perform sensing 1202 on DCI transmitted by the aggressor base station 102-*b* to the aggressor UE 104-*b* to schedule the aggressor UE 104-*b* with uplink resources. The victim UE 104-*a* can accordingly determine whether or not to receive downlink transmissions from the victim base station 102-*a* in certain periods of time where it may have CLI from uplink transmission from the aggressor UE 104-*b*, as described herein.

In an example, the victim UE 104-*a* can sense DCI that schedules an UL transmission from serving gNB (for SBFD) or from neighbor gNB (for dynamic TDD). This may occur where e.g. victim UE 104-*a* has lower priority, e.g. on aggressor's UE RRC-configured uplink symbol. To help with sensing, for dynamic TDD, the base station 102-*b* serving the aggressor UE 104-*b* may inform the base station 102-*a* serving the victim UE 104-*a* of the UL scheduled occasions (e.g., the periodic or aperiodic physical downlink control channel (PDCCH) occasions for DCI) via BH (e.g., Xn or F1) or OTA signaling. Then the base station 102-*a* serving the victim UE 104-*a* can signal victim UE 104-*a* of the UL scheduled occasions.

In this example, an estimated method for victim UE 104-*a* to sense about inter-UE CLI level before the actual DL reception may include the victim UE 104-*a* measuring the DCI scheduling UL traffic for the aggressor UE 104-*b*, where a rule can define that the UE only measured RSSI or RSRP of DCI is less than a threshold, then victim UE 104-*a* may receive DL for the scheduled PUSCH symbols/slots of aggressor UE 104-*b*. The UL can be scheduled by the measured DCI of base station 102-*b* serving the aggressor UE 104-*b*, which is decoded by the victim UE 104-*a*. Otherwise, victim UE 104-*a* may not receiving the DL traffic on the scheduled PUSCH symbols/slots of aggressor UE's UL transmission. In another example, the victim UE 104-*a* can indicate to serving gNB for gNB DL transmit power adjustment or beam adjustment. Other solutions may also apply to help inter-UE CLI reduction and power saving (skip reception with high CLI from neighbor UE).

Figure 13:
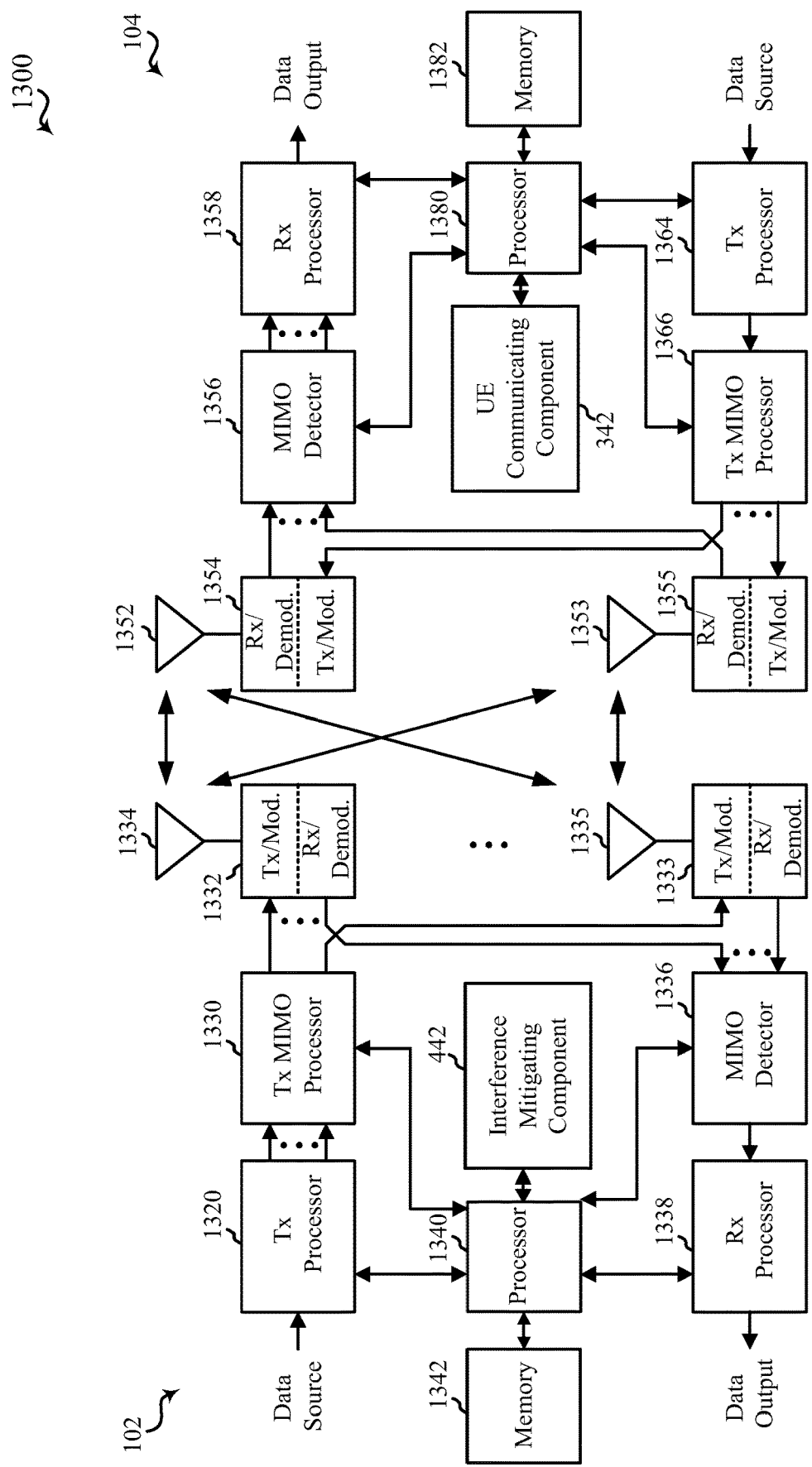
FIG. 13 is a block diagram illustrating an example of a multiple-input multiple-output (MIMO) communication system including a base station and a UE, in accordance with various aspects of the present disclosure.

FIG. 13 is a block diagram of a MIMO communication system 1300 including a base station 102 and a UE 104. The MIMO communication system 1300 may illustrate aspects of the wireless communication access network 100 described with reference to FIG. 1. The base station 102 may be an example of aspects of the base station 102 described with reference to FIG. 1. The base station 102 may be equipped with antennas 1334 and 1335, and the UE 104 may be equipped with antennas 1352 and 1353. In the MIMO communication system 1300, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 1320 may receive data from a data source. The transmit processor 1320 may process the data. The transmit processor 1320 may also generate control symbols or reference symbols. A transmit MIMO processor 1330 may perform spatial processing (e.g., precoding) on data symbols, control symbols, or reference symbols, if applicable, and may provide output symbol streams to the transmit modulator/demodulators 1332 and 1333. Each modulator/demodulator 1332 through 1333 may process a respective output symbol stream (e.g., for OFDM, etc.) to obtain an output sample stream. Each modulator/demodulator 1332 through 1333 may further process (e.g., convert to analog, amplify, filter, and upconvert) the output sample stream to obtain a DL signal. In one example, DL signals from modulator/demodulators 1332 and 1333 may be transmitted via the antennas 1334 and 1335, respectively.

The UE 104 may be an example of aspects of the UEs 104 described with reference to FIGS. 1 and 3. At the UE 104, the UE antennas 1352 and 1353 may receive the DL signals from the base station 102 and may provide the received signals to the modulator/demodulators 1354 and 1355, respectively. Each modulator/demodulator 1354 through 1355 may condition (e.g., filter, amplify, downconvert, and digitize) a respective received signal to obtain input samples. Each modulator/demodulator 1354 through 1355 may further process the input samples (e.g., for OFDM, etc.) to obtain received symbols. A MIMO detector 1356 may obtain received symbols from the modulator/demodulators 1354 and 1355, perform MIMO detection on the received symbols, if applicable, and provide detected symbols. A receive (Rx) processor 1358 may process (e.g., demodulate, deinterleave, and decode) the detected symbols, providing decoded data for the UE 104 to a data output, and provide decoded control information to a processor 1380, or memory 1382.

The processor 1380 may in some cases execute stored instructions to instantiate a UE communicating component 342 (see e.g., FIGS. 1 and 3).

On the uplink (UL), at the UE 104, a transmit processor 1364 may receive and process data from a data source. The transmit processor 1364 may also generate reference symbols for a reference signal. The symbols from the transmit processor 1364 may be precoded by a transmit MIMO processor 1366 if applicable, further processed by the modulator/demodulators 1354 and 1355 (e.g., for single carrier-FDMA, etc.), and be transmitted to the base station 102 in accordance with the communication parameters received from the base station 102. At the base station 102, the UL signals from the UE 104 may be received by the antennas 1334 and 1335, processed by the modulator/demodulators 1332 and 1333, detected by a MIMO detector 1336 if applicable, and further processed by a receive processor 1338. The receive processor 1338 may provide decoded data to a data output and to the processor 1340 or memory 1342.

The processor 1340 may in some cases execute stored instructions to instantiate an interference mitigating component 442 (see e.g., FIGS. 1 and 4).

The components of the UE 104 may, individually or collectively, be implemented with one or more ASICs adapted to perform some or all of the applicable functions in hardware. Each of the noted modules may be a means for performing one or more functions related to operation of the MIMO communication system 1300. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 1300.

The following aspects are illustrative only and aspects thereof may be combined with aspects of other embodiments or teaching described herein, without limitation.

Aspect 1 is a method for wireless communication at an aggressor UE including measuring a signal metric of a downlink transmission from a victim serving network node that serves a victim UE, and transmitting or refraining from transmitting an uplink transmission to a serving network node that serves the aggressor UE based on comparing the signal metric to a threshold related to inter-UE cross link interference.

In Aspect 2, the method of Aspect 1 includes where transmitting or refraining from transmitting includes transmitting the uplink transmission when the signal metric is less than the threshold.

In Aspect 3, the method of any of Aspects 1 or 2 includes where transmitting or refraining from transmitting includes refraining from transmitting the uplink transmission when the signal metric achieves the threshold.

In Aspect 4, the method of any of Aspects 1 to 3 includes where measuring the signal metric is based on receiving, for the victim serving network node, an indication of resources over which the downlink transmission is scheduled.

In Aspect 5, the method of Aspect 4 includes where the indication of resources correspond to periodic or aperiodic resources over which the victim serving network node transmits a physical downlink control channel.

In Aspect 6, the method of any of Aspects 1 to 5 includes where measuring the signal metric is based on determining that the victim UE has a higher priority than the aggressor UE in a period of time during which the uplink transmission is scheduled.

In Aspect 7, the method of any of Aspects 1 to 6 includes where measuring the signal metric includes measuring a DCI scheduling subsequent downlink transmissions for the victim UE.

In Aspect 8, the method of Aspect 7 includes where transmitting or refraining from transmitting includes transmitting or refraining from transmitting the uplink transmission over a period of time indicated for the subsequent downlink transmissions in the DCI.

In Aspect 9, the method of any of Aspects 1 to 8 includes where transmitting or refraining from transmitting an uplink transmission includes adjusting, based on comparing the signal metric to a threshold, an uplink transmit power or an uplink beam used for transmitting the uplink transmission.

Aspect 10 is a method for wireless communication at an aggressor network node serving an aggressor UE that includes receiving, from a victim network node serving a victim UE, an indication of resources over which the victim network node schedules downlink transmission to the victim UE and transmitting, to the aggressor UE, an indication of the resources.

Aspect 11 is a method for wireless communication at a victim network node serving a victim UE that includes transmitting, to an aggressor network node serving an aggressor UE, an indication of resources over which the victim network node schedules downlink transmission to the victim UE, and transmitting, to the victim UE, the downlink transmission over the resources.

Aspect 12 is a method for wireless communication at a victim UE including measuring a signal metric of a DCI from an aggressor network node that schedules uplink transmission for an aggressor UE, and receiving or refraining from receiving a downlink transmission from a serving network node that serves the victim UE based on comparing the signal metric to a threshold related to inter-UE cross link interference.

In Aspect 13, the method of Aspect 12 includes where receiving or refraining from receiving includes receiving the downlink transmission when the signal metric is less than the threshold.

In Aspect 14, the method of any of Aspects 12 or 13 includes where receiving or refraining from receiving includes refraining from receiving the downlink transmission when the signal metric achieves the threshold.

In Aspect 15, the method of any of Aspects 12 to 14 includes where measuring the DCI is based on receiving, for the aggressor network node, an indication of resources over which the DCI is transmitted.

In Aspect 16, the method of Aspect 15 includes where the indication of resources correspond to periodic or aperiodic resources over which the aggressor network node transmits a physical downlink control channel.

In Aspect 17, the method of any of Aspects 12 to 16 includes where measuring the signal metric is based on determining that the aggressor UE has a higher priority than the victim UE in a period of time during which the downlink transmission is scheduled.

In Aspect 18, the method of Aspect 17 includes where receiving or refraining from receiving includes receiving or refraining from receiving the downlink transmission over a period of time indicated in the DCI.

In Aspect 19, the method of any of Aspects 12 to 18 includes transmitting, to the serving network node and based on comparing the signal metric to a threshold, at least one of an indication of a downlink power adjustment, or, for the aggressor network node, an uplink transmit power, or an uplink beam used for the aggressor UE to use in transmitting the uplink transmission.

Aspect 20 is a method for wireless communication at a victim network node serving a victim UE including receiving, from an aggressor network node serving an aggressor UE, an indication of resources over which the aggressor network node schedules uplink transmission for the aggressor UE, and transmitting, to the victim UE, an indication of the resources.

Aspect 21 is a method for wireless communication at an aggressor network node serving an aggressor UE including transmitting, to a victim network node serving a victim UE, an indication of resources over which the aggressor network node schedules uplink transmission for the aggressor UE, and transmitting, to the aggressor UE, a DCI including an uplink grant over the resources.

Aspect 22 is an apparatus for wireless communication including a processor, memory coupled with the processor, and instructions stored in the memory and operable, when executed by the processor, to cause the apparatus to perform any of the methods of Aspects 1 to 21.

Aspect 23 is an apparatus for wireless communication including means for performing any of the methods of Aspects 1 to 21.

Aspect 24 is a computer-readable medium including code executable by one or more processors for wireless communications, the code including code for performing any of the methods of Aspects 1 to 21.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
   a processor;
   memory coupled with the processor; and
   instructions stored in the memory and operable, when executed by the processor, to cause the apparatus to:
     measure a signal metric of a downlink transmission from a victim serving network node that serves a victim user equipment (UE); and
     transmit or refrain from transmitting an uplink transmission to a serving network node that serves the apparatus based on comparing the signal metric to a threshold for detecting inter-UE cross link interference.

2. The apparatus of claim 1, wherein the instructions, when executed by the processor, cause the apparatus to transmit the uplink transmission when the signal metric is less than the threshold.

3. The apparatus of claim 1, wherein the instructions, when executed by the processor, cause the apparatus to refrain from transmitting the uplink transmission when the signal metric achieves the threshold.

4. The apparatus of claim 1, wherein the instructions, when executed by the processor, cause the apparatus to measure the signal metric based on receiving, for the victim serving network node, an indication of resources over which the downlink transmission is scheduled.

5. The apparatus of claim 4, wherein the indication of resources corresponds to periodic or aperiodic resources over which the victim serving network node transmits a physical downlink control channel.

6. The apparatus of claim 1, wherein the instructions, when executed by the processor, cause the apparatus to measure the signal metric based on determining that the victim UE has a higher priority than the apparatus in a period of time during which the uplink transmission is scheduled.

7. The apparatus of claim 1, wherein the instructions, when executed by the processor, cause the apparatus to transmit measure the signal metric at least in part by measuring a downlink control information (DCI) scheduling subsequent downlink transmissions for the victim UE.

8. The apparatus of claim 7, wherein the instructions, when executed by the processor, cause the apparatus to transmit or refrain from transmitting the uplink transmission over a period of time indicated for the subsequent downlink transmissions in the DCI.

9. The apparatus of claim 1, wherein the instructions, when executed by the processor, cause the apparatus to adjust, based on comparing the signal metric to a threshold, an uplink transmit power or an uplink beam used for transmitting the uplink transmission.

10. An apparatus for wireless communication, comprising:
a processor;
memory coupled with the processor; and
instructions stored in the memory and operable, when executed by the processor, to cause the apparatus to:
measure a signal metric of a downlink control information (DCI) from an aggressor network node that schedules uplink transmission for an aggressor user equipment (UE); and
receive or refrain from receiving a downlink transmission from a serving network node that serves the apparatus based on comparing the signal metric to a threshold for detecting inter-UE cross link interference.

11. The apparatus of claim 10, wherein the instructions, when executed by the processor, cause the apparatus to receive the downlink transmission when the signal metric is less than the threshold.

12. The apparatus of claim 10, wherein the instructions, when executed by the processor, cause the apparatus to refrain from receiving the downlink transmission when the signal metric achieves the threshold.

13. The apparatus of claim 10, wherein the instructions, when executed by the processor, cause the apparatus to measure the DCI based on receiving, for the aggressor network node, an indication of resources over which the DCI is transmitted.

14. The apparatus of claim 13, wherein the indication of resources corresponds to periodic or aperiodic resources over which the aggressor network node transmits a physical downlink control channel.

15. The apparatus of claim 10, wherein the instructions, when executed by the processor, cause the apparatus to measure the signal metric based on determining that the aggressor UE has a higher priority than the apparatus in a period of time during which the downlink transmission is scheduled.

16. The apparatus of claim 15, wherein the instructions, when executed by the processor, cause the apparatus to receive or refrain from receiving the downlink transmission over a period of time indicated in the DCI.

17. The apparatus of claim 10, wherein the instructions, when executed by the processor, cause the apparatus to transmit, to the serving network node and based on comparing the signal metric to a threshold, at least one of an indication of a downlink power adjustment, or, for the aggressor network node, an uplink transmit power, or an uplink beam used for the aggressor UE to use in transmitting the uplink transmission.

18. A method for wireless communication at an aggressor user equipment (UE), comprising:
measuring a signal metric of a downlink transmission from a victim serving network node that serves a victim UE; and
transmitting or refraining from transmitting an uplink transmission to a serving network node that serves the aggressor UE based on comparing the signal metric to a threshold for detecting inter-UE cross link interference.

19. The method of claim 18, wherein transmitting or refraining from transmitting includes transmitting the uplink transmission when the signal metric is less than the threshold.

20. The method of claim 18, wherein transmitting or refraining from transmitting includes refraining from transmitting the uplink transmission when the signal metric achieves the threshold.

21. The method of claim 18, wherein measuring the signal metric is based on receiving, for the victim serving network node, an indication of resources over which the downlink transmission is scheduled.

22. The method of claim 21, wherein the indication of resources corresponds to periodic or aperiodic resources over which the victim serving network node transmits a physical downlink control channel.

23. The method of claim 18, wherein measuring the signal metric is based on determining that the victim UE has a higher priority than the aggressor UE in a period of time during which the uplink transmission is scheduled.

24. The method of claim 18, wherein measuring the signal metric includes measuring a downlink control information (DCI) scheduling subsequent downlink transmissions for the victim UE, and wherein transmitting or refraining from transmitting includes transmitting or refraining from transmitting the uplink transmission over a period of time indicated for the subsequent downlink transmissions in the DCI.

25. A method for wireless communication at a victim user equipment (UE), comprising:
measuring a signal metric of a downlink control information (DCI) from an aggressor network node that schedules uplink transmission for an aggressor UE; and
receiving or refraining from receiving a downlink transmission from a serving network node that serves the victim UE based on comparing the signal metric to a threshold for detecting inter-UE cross link interference.

26. The method of claim 25, wherein receiving or refraining from receiving includes receiving the downlink transmission when the signal metric is less than the threshold.

27. The method of claim 25, wherein receiving or refraining from receiving includes refraining from receiving the downlink transmission when the signal metric achieves the threshold.

28. The method of claim 25, wherein measuring the DCI is based on receiving, for the aggressor network node, an indication of resources over which the DCI is transmitted, and wherein the indication of resources corresponds to periodic or aperiodic resources over which the aggressor network node transmits a physical downlink control channel.

29. The method of claim 25, wherein measuring the signal metric is based on determining that the aggressor UE has a higher priority than the victim UE in a period of time during which the downlink transmission is scheduled, and wherein receiving or refraining from receiving includes receiving or refraining from receiving the downlink transmission over a period of time indicated in the DCI.

30. The method of claim 25, further comprising transmitting, to the victim network node and based on comparing the signal metric to a threshold, at least one of an indication of a downlink power adjustment, or, for the aggressor network node, an uplink transmit power, or an uplink beam used for the aggressor UE to use in transmitting the uplink transmission.

* * * * *